(12) United States Patent
Hayakawa et al.

(10) Patent No.: US 10,741,301 B2
(45) Date of Patent: Aug. 11, 2020

(54) CABLE AND WIRE HARNESS

(71) Applicant: Hitachi Metals, Ltd., Tokyo (JP)

(72) Inventors: Yoshikazu Hayakawa, Tokyo (JP);
Tomoyuki Murayama, Tokyo (JP);
Hirotaka Eshima, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/443,631

(22) Filed: Jun. 17, 2019

(65) Prior Publication Data

US 2019/0385764 A1    Dec. 19, 2019

(30) Foreign Application Priority Data

Jun. 19, 2018   (JP) ................................. 2018-115750

(51) Int. Cl.
*H01B 7/00* (2006.01)
*B60R 16/02* (2006.01)

(52) U.S. Cl.
CPC ....... *H01B 7/0045* (2013.01); *B60R 16/0207* (2013.01)

(58) Field of Classification Search
None
See application file for complete search history.

(56) References Cited

U.S. PATENT DOCUMENTS

| | | | | |
|---|---|---|---|---|
| 2,167,538 | A * | 7/1939 | Turk | H01B 11/1873 174/28 |
| 2,253,984 | A * | 8/1941 | Shanklin | H01B 9/06 156/48 |
| 3,194,872 | A * | 7/1965 | Garner | H01B 13/08 174/25 R |
| 3,226,076 | A * | 12/1965 | Spuhler | H02G 3/263 248/327 |
| 3,619,474 | A * | 11/1971 | Beck | H01B 11/1834 174/19 |
| 4,487,991 | A * | 12/1984 | Forsyth | H01B 9/0611 174/110 PM |
| 4,939,317 | A * | 7/1990 | Hostler | H01B 11/1847 174/107 |
| 6,462,268 | B1 * | 10/2002 | Hazy | H01B 7/1895 174/113 R |
| 8,577,196 | B1 * | 11/2013 | McNutt | G02B 6/4435 385/107 |
| 10,410,762 | B2 * | 9/2019 | Hayakawa | H01B 7/1855 |
| 2009/0274426 | A1 * | 11/2009 | Lail | G02B 6/4486 385/105 |

(Continued)

FOREIGN PATENT DOCUMENTS

| | | | | |
|---|---|---|---|---|
| JP | 2016-062863 A | | 4/2016 | |
| WO | WO2017046848 | * | 3/2017 | ............ H01B 11/02 |

*Primary Examiner* — Daniel P Wicklund
*Assistant Examiner* — Muhammed Azam
(74) *Attorney, Agent, or Firm* — McGinn I. P. Law Goup, PLLC.

(57) ABSTRACT

A cable includes a plurality of electric wires, a tape member spirally wound around an assembled article that is formed by bundling the plurality of electric wires, and a sheath covering the tape member. The tape member includes a plurality of entangled fibers. A plurality of linear slits are formed on the tape member so as to penetrate the tape member.

17 Claims, 5 Drawing Sheets

(56) References Cited

U.S. PATENT DOCUMENTS

| | | | |
|---|---|---|---|
| 2011/0206886 A1* | 8/2011 | Kim | C09J 11/04 |
| | | | 428/41.8 |
| 2012/0193122 A1* | 8/2012 | Sugiyama | H01B 11/183 |
| | | | 174/113 R |
| 2013/0249749 A1* | 9/2013 | Nitta | B60R 16/0207 |
| | | | 343/720 |
| 2016/0236631 A1* | 8/2016 | Kamijo | B60R 16/0215 |
| 2017/0236617 A1* | 8/2017 | Hayakawa | H01B 7/0045 |
| | | | 174/72 A |
| 2017/0264063 A1* | 9/2017 | Hayakawa | H01R 31/005 |

* cited by examiner

CABLE AND WIRE HARNESS

CROSS-REFERENCE TO RELATED APPLICATIONS

The present application is based on Japanese patent application No. 2018-115750 filed on Jun. 19, 2018, the entire contents of which are incorporated herein by reference.

TECHNICAL FIELD

The invention relates to a cable and a wire harness.

RELATED ART

A cable used for vehicle wire harness is known which is provided with plural electric wires, a tape member wound around an assembled article as a bundle of the plural electric wires and a sheath covering the tape member. The tape member is formed of paper or nonwoven fabric (see, e.g., JP 2016/62863 A).

SUMMARY OF INVENTION

End processing is performed on an end of the cable to remove the sheath and the tape member. At the time of the end processing, a cut is made by a blade to remove the sheath. For example, if the blade does not reach the tape member, a cut may not be made on the tape member so that the tape member becomes difficult to remove.

It is an object of the invention to provide a cable and a wire harness that can improve the removing workability of the tape member in the end processing to remove the sheath and tape member.

According to one aspect of the invention, a cable comprises:
- a plurality of electric wires;
- a tape member wound around an assembled article that is formed by bundling the plurality of electric wires; and
- a sheath covering the tape member,
- wherein the tape member comprises a plurality of entangled fibers, and
- wherein a plurality of holes are formed on the tape member so as to penetrate the tape member.

According to another aspect of the invention, a wire harness comprises:
- the cable as mentioned above; and
- a connector attached to an end portion of one of the plurality of electric wires.

Advantageous Effects of Invention

A cable and a wire harness can be provided that can improve the removing workability of the tape member in the end processing to remove the sheath and tape member.

DESCRIPTION OF EMBODIMENTS

Embodiment

An embodiment of the invention will be described below in conjunction with the appended drawings.

(Description of a Vehicle in which a Wire Harness is Used)

Figure 1:
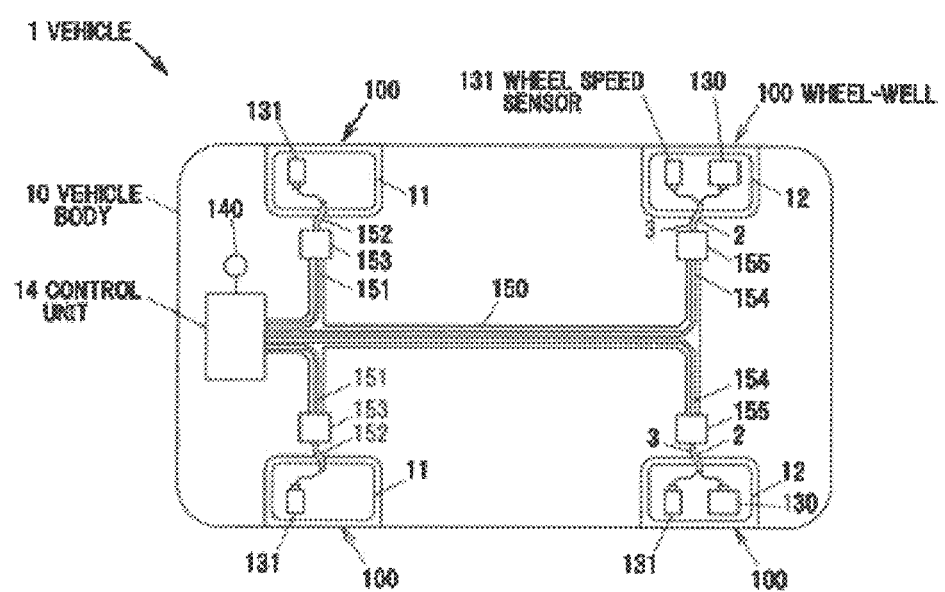
FIG. 1 is a schematic diagram illustrating a configuration of a vehicle in which a cable in an embodiment of the present invention is used.

FIG. 1 is a schematic diagram illustrating a configuration of a vehicle in which a cable in the present embodiment is used.

A vehicle 1 has four wheel-wells 100 on a vehicle body 10, and two front wheels 11 and two rear wheels 12 are respectively arranged in the wheel-wells 100. In the present embodiment, the vehicle 1 is a front-wheel-drive vehicle and the front wheels 11 are driven by a drive force from a drive source (not shown) such as an engine or electric motor. In other words, in the present embodiment, the front wheels 11 are drive wheels and the rear wheels 12 are trailer wheels.

The vehicle 1 also has two electric parking brake units 130 and a control unit 14. The electric parking brake units 130 are provided so as to respectively correspond to the two rear wheels 12, are activated by a current supplied from the control unit 14 and generate a braking force applied to the rear wheels 12. The control unit 14 can detect an operating state of a parking brake activation switch 140 provided inside a passenger compartment of a vehicle and a driver can activate or deactivate the electric parking brake units 130 by an on/off operation of the parking brake activation switch 140.

When a driver turns the parking brake activation switch 140 from, e.g., an off state to an on state during when the vehicle is not in motion, an operating current for activating the electric parking brake units 130 is output from the control unit 14 for a predetermined period of time (e.g., for 1 second). The electric parking brake units 130 are thereby activated and generate a braking force applied to the rear wheels 12. The activated state of the electric parking brake units 130 is maintained until a current to deactivate the electric parking brake units 130 is output from the control unit 14. In this manner, the electric parking brake units 130 generate a braking force mainly after the vehicle 1 stops.

The control unit 14 outputs a current to deactivate the electric parking brake units 130 when the parking brake activation switch 140 is switched from the on state to the off state by an operation of the driver. The control unit 14 outputs a current to deactivate the electric parking brake units 130 also when, e.g., an accelerator pedal is depressed, in addition to when the parking brake activation switch 140 is turned off.

Meanwhile, each of the front wheels 11 and the rear wheels 12 is provided with a wheel speed sensor (ABS sensors) 131 for detecting a wheel speed. The wheel speed sensor 131 itself is a well-known wheel speed sensor which has a magnetic field sensing element for detecting a magnetic field of an annular magnetic encoder rotating together with the front wheel 11 or the rear wheel 12 and detects a wheel speed (a rotation speed of the front wheel 11 or the rear wheel 12) based on the cycle of change in the direction of the magnetic field.

The control unit 14 is electrically connected to the wheel speed sensors 131 of the front wheels 11 through front wheel wire groups 151 each composed of plural electric wires, and front wheel wire harnesses 152. In each junction box 153 which is fixed to the vehicle body 10, the front wheel wire group 151 is connected to the front wheel wire harness 152. The junction boxes 153 are respectively arranged in the vicinities of the pair of right and left front wheels 11.

The control unit 14 is also electrically connected to the electric parking brake units 130 and the wheel speed sensors 131 of the rear wheels 12 through rear wheel wire groups 154 each composed of plural electric wires, and wire harnesses 2 each using a cable 3 in the present embodiment. In each junction box 155 which is fixed to the vehicle body 10, the rear wheel wire group 154 is connected to the wire harness 2. The junction boxes 155 are respectively arranged in the vicinities of the pair of right and left rear wheels 12.

The front wheel wire groups 151 are arranged in a bundled state on a wiring path 150 provided on the vehicle body 10. The rear wheel wire groups 154 are also arranged in a bundled state on the wiring path 150 provided on the vehicle body 10, in the same manner as the front wheel wire groups 151.

One end of the front wheel wire harness 152 is connected to the wheel speed sensor 131 of the front wheel 11, and the other end is housed in the junction box 153. One end of the rear wheel wire harness 2 is connected to the electric parking brake unit 130 and the wheel speed sensor 131 of the rear wheel 12, and the other end is housed in the junction box 155.

(Configuration of the Cable 3)

Figure 2A:
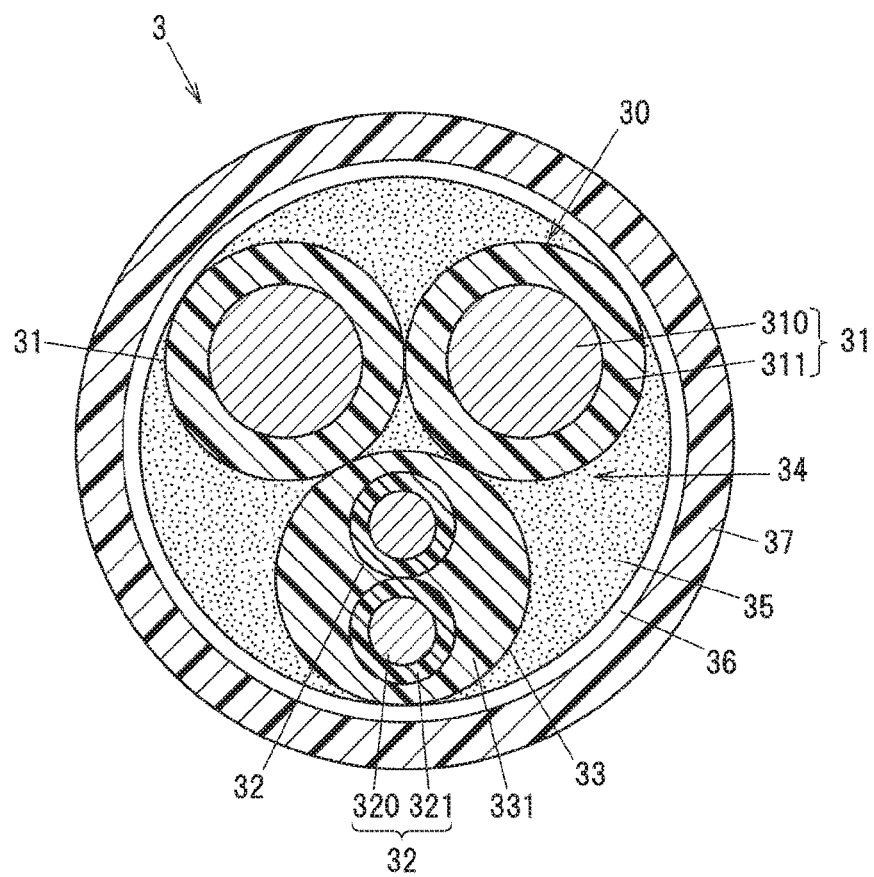
FIG. 2A is a cross sectional view showing the cable in the embodiment of the invention.
Figure 2B:
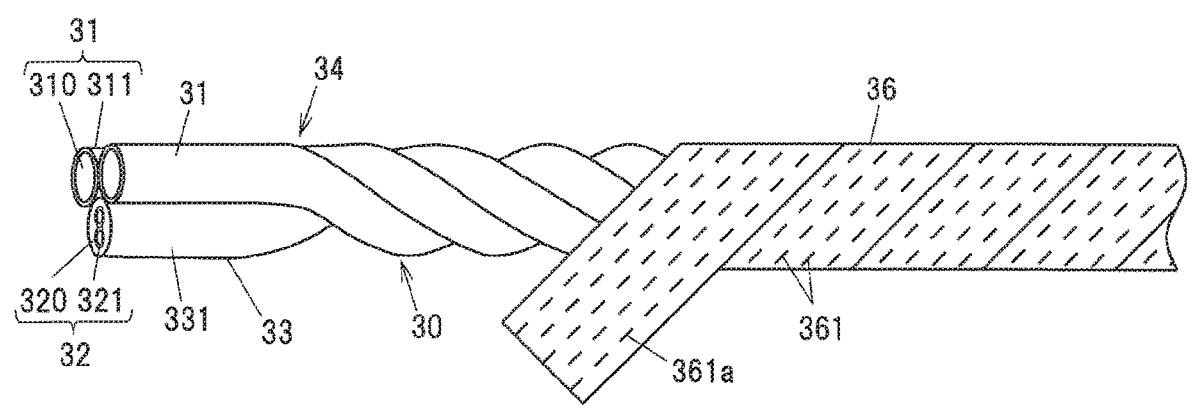
FIG. 2B is an explanatory diagram illustrating a wound state of a tape member.

FIG. 2A is a cross sectional view showing the cable 3 in the present embodiment and FIG. 2B is an explanatory diagram illustrating a wound state of a tape member.

As shown in FIGS. 2A and 2B, the cable 3 is provided with plural electric wires 30, a tape member 36 wound around an assembled article 34 which is formed by bundling the plural electric wires 30, and a sheath 37 covering the tape member 36. In the present embodiment, the plural electric wires 30 consist of four insulated wires in total; a pair of power lines 31 and a pair of signal lines 32.

In the cable 3, the pair of signal lines 32 are twisted together and a signal cable 33 is formed by covering the twisted signal lines 32 with an inner sheath 331. In addition, in cable 3, the assembled article 34 is formed by twisting the pair of power lines 31, the signal cable 33 and a filler 35 together, and the tape member 36 is spirally wound around the assembled article 34. In FIG. 2B, the filler 35 is omitted to simplify the drawing. The pair of power lines 31 are used to supply a current to the electric parking brake unit 130. The pair of signal lines 32 are used to transmit a detection signal from the wheel speed sensor 131 to the control unit 14. That is, vehicle state quantity detection signals indicating the running state of the vehicle 1 are transmitted to the control unit 14 through the pair of signal lines 32 when the vehicle 1 is in motion.

Each of the pair of power lines 31 is an insulated wire formed by covering a central conductor 310 comprising a highly conductive wire of copper, etc., with an insulation 311 formed of an insulating resin. The central conductor 310 is a twisted wire formed of plural strands. The insulation 311 is formed of, e.g., a crosslinked PE (polyethylene) or a crosslinked flame-retardant PE (polyethylene).

The signal line 32 is an insulated wire formed by covering a central conductor 320 comprising a highly conductive wire of copper, etc., with an insulation 321 formed of an insulating resin. The central conductor 320 is a twisted wire formed of plural strands. The insulation 321 is formed of, e.g., a crosslinked PE (polyethylene) or a crosslinked flame-retardant PE (polyethylene). The signal line 32 has a smaller outer diameter than the power line 31. The inner sheath 331 covering the pair of twisted signal lines 32 is formed of a soft thermoplastic urethane which is excellent in flexibility and durability.

The power lines 31 and the signal lines 32 are not covered with a shield conductor. In other words, any conductive members for shielding electromagnetic wave are not arranged between the power lines 31 and the signal lines 32. This is because it is not necessary to provide a shield conductor between the signal lines 32 and the power lines 31 since a current flows through the power lines 31 mainly during when the vehicle 1 is not in motion and electrical signals are transmitted through the signal lines 32 mainly during when the vehicle 1 is in motion. That is, when a current flows through the pair of power lines 31, electromagnetic wave generated by the current can affect a potential difference between the pair of signal lines 32. However, since the control unit 14 can be set to ignore the electrical signals transmitted through the signal lines 32 during when the vehicle 1 is not in motion, i.e., when a vehicle speed is zero, an adverse effect on travel of the vehicle 1 can be avoided. In addition, not covering the signal lines 32 with a shield conductor increases flexibility and bendability of the cable 3 and also contributes to weight reduction and cost reduction of the cable 3.

The filler 35 is preferably formed of plural string-shaped (fibrous) members extending in the longitudinal direction of the cable 3. The filler 35 serves to make the cross-sectional shape after winding the tape member 36 around the assembled article 34 closer to a circular shape. As the filler 35, it is possible to use a fibrous material such as polypropylene yarn, spun rayon yarn (rayon staple fiber), aramid fiber, nylon fiber or fiber plastic, a paper or a cotton yarn.

The sheath 37 is formed of an insulating resin. In the present embodiment, the sheath 37 is formed of a soft thermoplastic urethane which is excellent in flexibility and durability.

(Configuration of the Tape Member 36)

Figure 3A:
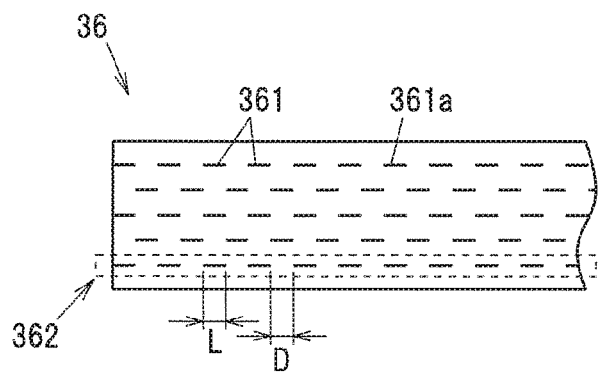
FIG. 3A is a plan view showing the tape member used for the cable shown in FIG. 2A FIGS. 3B and 3C are plan views showing modifications of the tape member.

FIG. 3A is a plan view showing the tape member 36. The tape member 36 formed by entangling plural fibers is used in the cable 3. In more detail, it is possible to use the tape member 36 formed of a paper in which plant fiber such as pulp is mainly used as the fibers, or a nonwoven fabric in which animal fiber such as wool or chemical fiber such as rayon is used as the fibers. In this example, a nonwoven fabric formed of chemical fibers is used as the tape member 36.

As shown in FIGS. 2B and 3A, the cable 3 in the present embodiment is configured that plural holes 361 are formed on the tape member 36 so as to penetrate the tape member 36 at regular intervals in the longitudinal direction of the tape member 36. When papers or nonwoven fabrics are manufactured by entangling fibers, microscopic holes are naturally formed due to spaces between the fibers. The holes 361 larger than such microscopic holes are formed in the present embodiment. In the present embodiment, the holes 361 are intentionally formed by punching process so as to be arranged at regular intervals in the longitudinal direction of the tape member 36.

The plural holes 361 formed on the tape member 36 allows the tape member 36 to be torn easily since the holes 361 act like perforations and tears originate from the holes 361. Therefore, an end portion of the tape member 36 is easily removed at the time of the end processing.

Meanwhile, in case of conventional cables not having the holes 361, fibers constituting the tape member 36 fuzzes when tearing off the tape member 36 to remove the end portion of the tape member 36, and this may affect workability of the subsequent process such as connector connecting work. When the holes 361 are formed as in the present embodiment, the fibers at the holes 361 are preliminarily cut and this can reduce fuzz at the time of removing the end portion of the tape member 36, thereby improving workability of the subsequent process such as connector connecting work. When tears originated from the holes 361 occur, split lines gradually become longer from the holes 361 and tears occur relatively nicely. Therefore, the torn surface is less likely to fuzz.

Furthermore, since the holes 361 are formed, water (moisture) accumulated on the inner side of the tape member 36 can come out easily. As a result, it is possible to prevent foaming of the sheath 37 at the time of applying the sheath 37 due to expansion of water accumulated on the inner side of the tape member 36 and thereby prevent poor appearance caused by the foaming.

In the present embodiment, linear slits 361a are formed as the holes 361. Providing the slits 361a as the holes 361 improves flexibility, i.e., bendability (pliability) of the cable 3 since the slits 361a open when the cable 3 is bent and the tape member 36 is deformed in response to the bending. In addition, providing the slits 361a as the holes 361 also further improve workability of the end processing since the slits 361a open and tears originated from the slits 361a are thus likely to occur at the time of removing the end portion of the tape member 36.

The slits 361a are formed so that the slits 361a extend in a direction intersecting the cable longitudinal direction (the longitudinal direction of the assembled article 34) when the tape member 36 is wound around the assembled article 34. This is because if the slits 361a are formed to extend in a direction parallel to the cable longitudinal direction, the slits 361a may not open when the cable 3 is bent or the tape member 36 is pulled at the time of the end processing and the effect of improving flexibility or workability of the end processing may not be sufficiently obtained. That is, by forming the slits 361a so as to extend in a direction intersecting the cable longitudinal direction, it is possible to improve flexibility of the cable 3 and workability of the end processing.

In the present embodiment, the tape member 36 is spirally wound around the assembled article 34. In this case, the slits 361a are desirably formed to extend along the longitudinal direction of the tape member 36. When spirally winding the tape member 36 around the assembled article 34, it is necessary to apply a certain level of tension to the tape member 36. However, since the slits 361a when formed to extend along the longitudinal direction of the tape member 36 do not open even when the tension is applied at the time of winding the tape member 36, it is possible to prevent unintentional tear of the tape member 36 at the time of winding the tape member 36.

The slits 361a are two-dimensionally formed at regular intervals in a plan view of the tape member 36 (the plan view shown in FIG. 3A). In the present embodiment, plural slit rows 362 (five rows in this example), each composed of the slits 361a arranged at equal intervals in a longitudinal direction thereof, are formed so as to be spaced in a width direction perpendicular to the longitudinal direction of the slits 361a. In the present embodiment, the longitudinal direction of the slits 361a coincides with the longitudinal direction of the tape member 36, and the width direction of the slits 361a coincides with the width direction of the tape member 36.

Furthermore, in the present embodiment, the slit rows 362 adjacent in the width direction are formed so that the positions of the slits 361a are offset from each other in the longitudinal direction. In this example, the slits 361a are formed in a staggered pattern in such a manner that the slits 361a of the even number rows are arranged between the slits 361a of the odd number rows. Thus, it is easy to tear in a direction inclined with respect to the longitudinal direction of the tape member 36, thereby facilitating removal of the end portion of the tape member 36 at the time of the end processing.

A length L of the slit 361a is preferably not less than 1 mm and not more than 10 mm. The reason is as follows: when the length L of the slit 361a is less than 1 mm, the effect of improving flexibility of the cable 3 may not be sufficiently obtained. On the other hand, when the length L of the slit 361a is more than 10 mm, a resin may flow into the inside of the tape member 36 through the slits 361a at the time of applying the sheath 37, causing a decrease in workability of the end processing. A gap D between the slits 361a adjacent in the longitudinal direction thereof is long enough to allow the tape member 36 to be easily torn at the time of the end processing, and the gap D is preferably set to not more than the length L of the slit 361a.

Figure 3B:
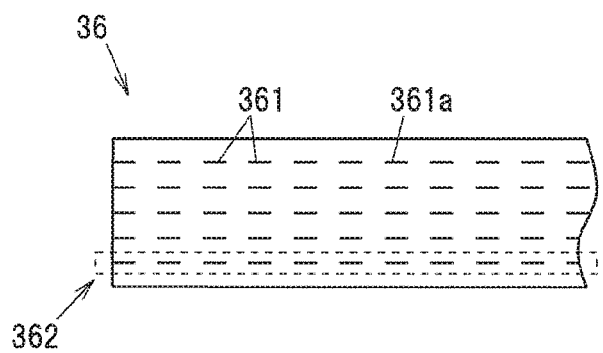

Although the slits 361a are formed in a staggered pattern in the present embodiment, it is not limited thereto and the slits 361a may be formed in a matrix pattern as shown in FIG. 3B. In the example shown in FIG. 3B, the slits 361a are arranged at equal interval in the longitudinal direction as well as in the width direction. However, in the example shown in FIG. 3B, the slits 361a are not formed in some portions in the longitudinal direction of the tape member 36, and stiffness of such portions may cause the cable 3 to be inflexible. Therefore, in case that the longitudinal direction of the slit 361a coincides with the longitudinal direction of the tape member 36, the slits 361a formed in a staggered pattern (or the slit rows 362 formed so that the positions of the slits 361a are offset in the longitudinal direction) are more desirable. When the slits 361a are formed in a matrix pattern, the longitudinal direction of the slit 361a is inclined with respect to the longitudinal direction of the tape member 36 so that portions not having the slits 361a are not formed in the longitudinal direction of the tape member 36.

Figure 3C:
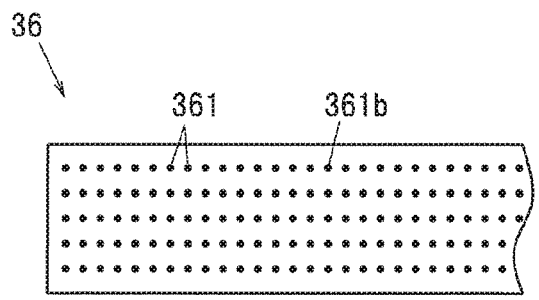

In addition, although the linear slits 361a are formed as the holes 361 in the present embodiment, the holes 361 may be dot holes 361b having a dot shape or a circular shape as shown in FIG. 3C. However, tears originated from the dot holes 361b are less likely to occur than those originated from the slits 361a, and in addition to this, the dot holes 361b may not be capable of sufficiently improving flexibility of the cable 3 since the dot holes 361b do not open as do the slits 361a. Therefore, the slit 361a is more desirable as the hole 361. When the dot hole 361b is used as the hole 361, the dot hole 361b desirably has the maximum diameter (an opening width at the position where the opening reaches the maximum size) of at least not less than 0.3 mm so that tears originated form the dot holes 361b are likely to occur at the time of the end processing.

Figure 4A:
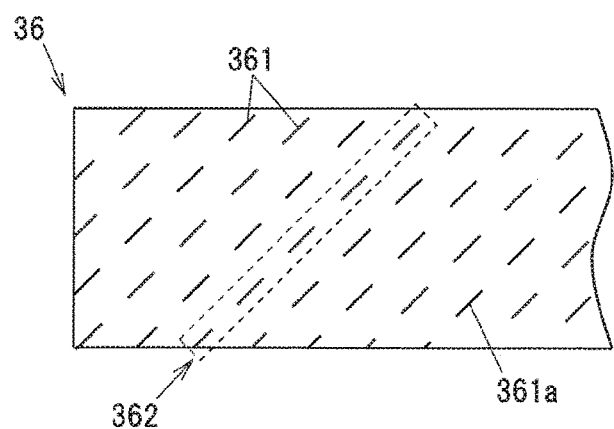
FIG. 4A is a plan view showing a modification of the tape member.
Figure 4B:
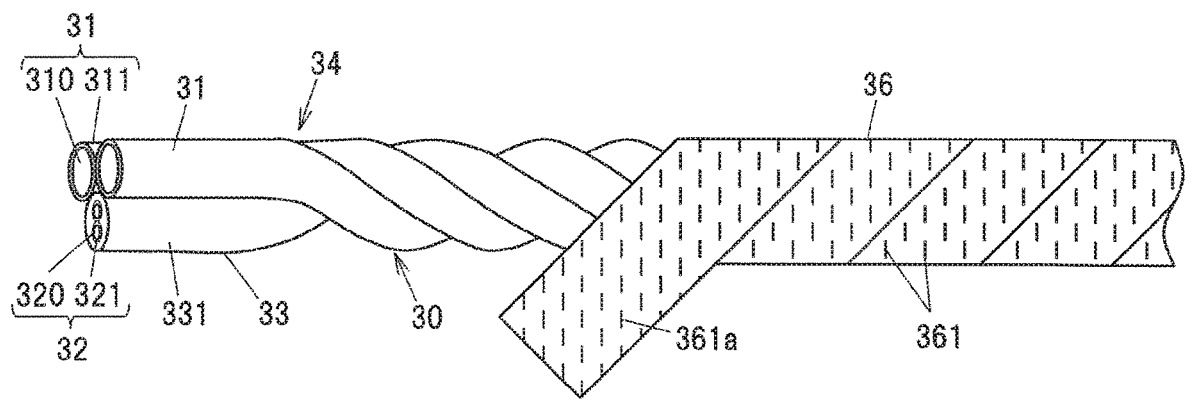
FIG. 4B is a perspective view when the tape member shown in FIG. 4A is wound around an assembled article.

Furthermore, in view of causing tears to occur more easily at the time of the end processing, an angle formed by the longitudinal direction of the tape member 36 and the longitudinal direction of the slit 361a may be appropriately adjusted while taking into account the winding angle of the tape member 36 so that the slits 361a extend in a direction substantially perpendicular to (e.g., not less than 80° and not more than 100° with respect to) the cable longitudinal direction when the tape member 36 is wound around the assembled article 34, as shown in FIGS. 4A and 4B.

Figure 5:
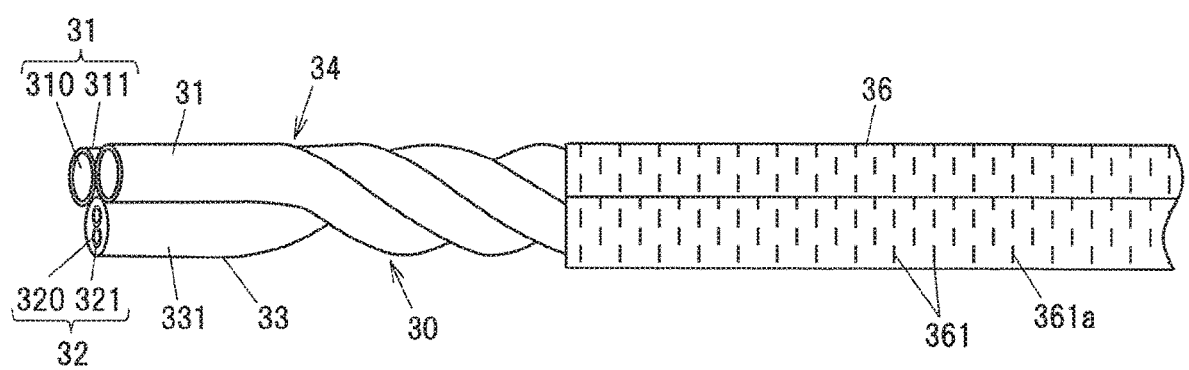
FIG. 5 is an explanatory diagram illustrating a wrapped state of the tape member of the cable in a modification of the invention.

In addition, although the example of spirally winding the tape member 36 around the assembled article 34 has been described in the present embodiment, the tape member 36 may be longitudinally wrapped around the assembled article 34, as shown in FIG. 5. In this case, by forming the slits 361a so as to extend along the width direction of the tape member 36, tears become more likely to occur at the time of the end processing and workability of the end processing is improved. An angle formed by the longitudinal direction of the tape member 36 and the longitudinal direction of the slit 361a in this case does not need to be exactly 90° and may be in the range of, e.g., not less than 80° and not more than 100°.

(Configuration of the Wire Harness 2)

Figure 6:
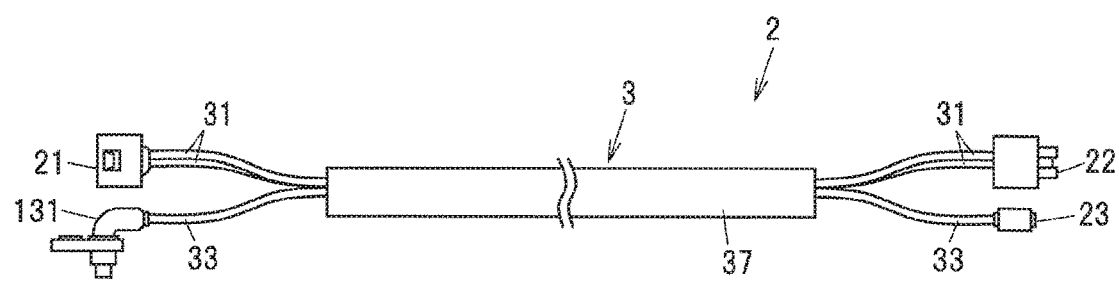
FIG. 6 is a schematic configuration diagram illustrating a wire harness in the embodiment.

FIG. 6 is a schematic configuration diagram illustrating a wire harness 2 in the present embodiment. As shown in FIG. 6, the wire harness 2 is provided with the cable 3 in the present embodiment and a connector attached to at least any of end portions of the plural electric wires 30 of the cable 3.

In FIG. 6, an end portion on the wheel 12 side is shown on the left side and an end portion on the vehicle body 10 side (the junction box 155 side) is shown on the right side. In the following description, an end of the wire harness 2 on the wheel 12 side is referred to as "one end" and an end on the vehicle body 10 side (the junction box 155 side) is referred to as "other end".

A wheel-side power connector 21 for connection to the electric parking brake unit 130 is attached to one end of the pair of power lines 31, and a vehicle body-side power connector 22 for connection to the rear wheel wire group 154 inside the junction box 155 is attached to the other end of the pair of power lines 31.

The wheel speed sensor 131 is attached to one end of the signal cable 33 (the pair of signal lines 32), and a vehicle body-side signal connector 23 for connection to the rear wheel wire group 154 inside the junction box 155 is attached to the other end of the signal cable 33 (the pair of signal lines 32).

Although the connectors 22 and 23 are separately provided on the other end of the pair of power lines 31 and the other end of the signal cable 33 in this example, one shared connector may be provided so that the pair of power lines 31 and the signal cable 33 are connected all together.

(Functions and Effects of the Embodiment)

The cable 3 in the present embodiment is configured that the plural holes 361 are formed on the tape member 36 so as to penetrate therethrough, as described above. Since this causes tears originated from the holes 361 to occur easily, the end portion of the tape member 36 is easily removed, and workability in removing the tape member 36 at the time of the end processing to remove the sheath 37 and the tape member 36 can be thus improved. In addition, since the fibers constituting the tape member 36 are preliminarily cut by forming the holes 361 and split lines gradually become longer from the holes 361 at the time of the end processing, tears occur relatively nicely. Therefore, fuzz is less likely to occur when the end portion of the tape member 36 is removed and workability of the subsequent process such as connector connecting work is thus improved. In other words, in the present embodiment, it is possible to improve workability of the end processing and the process subsequent thereto. Furthermore, since the holes 361 are formed, water can come out easily from the space surrounded by the tape member 36, resulting in that defective appearance caused by foaming of the sheath 37 can be prevented. The present invention is particularly effective when the tape member 36 is formed of nonwoven fabric which is relatively hard to tear.

(Summary of the Embodiments)

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A cable (3), comprising: a plurality of electric wires (30); a tape member (36) wound around an assembled article (34) that is formed by bundling the plurality of electric wires (30); and a sheath (37) covering the tape member (36), wherein the tape member (36) comprises a plurality of entangled fibers, and wherein a plurality of holes (361) are formed on the tape member (36) so as to penetrate the tape member (36).

[2] The cable (3) according to [1], wherein the tape member (36) comprises one of a paper and a nonwoven fabric.

[3] The cable (3) according to [1] or [2], wherein the holes (361) comprise linear slits (361a) extending in a direction intersecting a cable longitudinal direction.

[4] The cable (3) according to [3], wherein the tape member (36) is spirally wound around the assembled article (34), and wherein the slits (361a) are formed to extend along a longitudinal direction of the tape member (36).

[5] The cable (3) according to [3], wherein the tape member (36) is longitudinally wrapped around the assembled article (34), and wherein the slits (361a) are formed to extend along a width direction of the tape member (36).

[6] The cable (3) according to any one of [3] to [5], wherein a plurality of slit rows (362), each comprising the slits (361a) arranged at equal intervals in a longitudinal direction thereof, are formed so as to be spaced in a width direction perpendicular to the longitudinal direction, and wherein the slit rows (362) adjacent in the width direction are formed so that the positions of the slits (361a) are offset from each other in the longitudinal direction.

[7] The cable (3) according to any one of [3] to [6], wherein the length of the slit (361a) is not less than 1 mm and not more than 10 mm.

[8] A wire harness (2), comprising: the cable (3) according to any one of [1] to [7]; and a connector attached to an end portion of one of the plurality of electric wires (30).

Although the embodiment of the invention has been described, the invention according to claims is not to be limited to the embodiment described above. Further, please note that all combinations of the features described in the embodiment are not necessary to solve the problem of the invention. In addition, the invention can be appropriately modified and implemented without departing from the gist thereof.

The invention claimed is:

1. A cable, comprising:
 a plurality of electric wires;
 a tape member spirally wound around an assembled article that is formed by bundling the plurality of electric wires; and
 a sheath covering the tape member,
 wherein the tape member comprises a plurality of entangled fibers,
 wherein a plurality of linear slits are formed on the tape member so as to penetrate the tape member,
 wherein the plurality of linear slits extend in a direction intersecting a longitudinal direction of the tape member, and
 wherein an angle between a longitudinal direction of an extension of each slit of the plurality of linear slits and the longitudinal direction of the tape member is in a rangw from 80° to 100°.

2. The cable according to claim 1, wherein the tape member comprises one of a paper and a nonwoven fabric.

3. The cable according to claim 1, wherein the plurality of linear slits extend in a direction intersecting a cable longitudinal direction.

4. The cable according to claim 3, wherein the tape member is longitudinally wrapped around the assembled article, and
 wherein the plurality of linear slits are formed to extend along a width direction of the tape member.

5. The cable according to claim 3, wherein a plurality of slit rows, each comprising the plurality of linear slits arranged at equal intervals, are formed so as to be spaced in a width direction perpendicular to the longitudinal direction of the tape member, and
 wherein the slit rows adjacent in the width direction are formed so that positions of the plurality of linear slits are offset from each other in the longitudinal direction of the tape member.

6. The cable according to claim 3, wherein a length of a slit of the plurality of linear slits is not less than 1 mm and not more than 10 mm.

7. A wire harness, comprising:
 the cable according to claim 1; and
 a connector attached to an end portion of one of the plurality of electric wires in the cable.

8. The cable according to claim 1, wherein a longitudinal direction of an extension of the plurality of linear slits is different from the longitudinal direction of the tape member.

9. The cable according to claim 1, wherein the longitudinal direction of the extension of each slit of the plurality of linear slits is different from a width direction of the tape member.

10. The cable according to claim 1, wherein the longitudinal direction of the extension of each slit of the plurality of linear slits is different from a width direction of the tape member.

11. The cable according to claim 1, wherein said each slit of the plurality of linear slits has a circular shape.

12. The cable according to claim 1, wherein the direction that the plurality of linear slits extend is different from a width direction of the tape member.

13. The cable according to claim 1, wherein one of the plurality of electric wires comprises a first electric wire, a second electric wire, and the sheath collectively covering the first electric wire and the second electric wire.

14. The cable according to claim 13, wherein each of the plurality, of electric wires includes a central conductor and an insulation that covers the central conductor.

15. The cable according to claim 14, wherein the sheath covers the insulation of the first electric wire and the insulation of the second electric wire.

16. The cable according to claim 14, wherein the sheath collectively covers the insulation of the first electric wire and the insulation of the second electric wire.

17. The cable according to claim 16, wherein, in a cross-sectional view, a straight line connecting between respective centers of the central conductors of the first and second electric wires intersects with a straight line connecting between respective centers of the central conductors of electric wires of the plurality of electric wires other than the one of the plurality of electric wires.

* * * * *